(12) United States Patent
Crispin

(10) Patent No.: US 9,115,958 B2
(45) Date of Patent: Aug. 25, 2015

(54) DUAL FIELD OPTICAL AIMING SYSTEM FOR PROJECTILE WEAPONS

(71) Applicant: Leupold & Stevens, Inc., Beaverton, OR (US)

(72) Inventor: Quint Crispin, Beaverton, OR (US)

(73) Assignee: Leupold & Stevens, Inc., Beaverton, OR (US)

( * ) Notice: Subject to any disclaimer, the term of this patent is extended or adjusted under 35 U.S.C. 154(b) by 18 days.

(21) Appl. No.: 13/843,445

(22) Filed: Mar. 15, 2013

(65) Prior Publication Data

US 2014/0259853 A1 Sep. 18, 2014

(51) Int. Cl.
*F41G 1/38* (2006.01)
*G02B 23/14* (2006.01)
*F41G 1/30* (2006.01)

(52) U.S. Cl.
CPC .. *F41G 1/38* (2013.01); *F41G 1/30* (2013.01); *G02B 23/14* (2013.01)

(58) Field of Classification Search
CPC ............... F41G 1/30; F41G 1/38; F41G 1/34; F41G 1/17; G02B 23/10; G02B 23/105
USPC ................................................... 42/111–148
See application file for complete search history.

(56) References Cited

U.S. PATENT DOCUMENTS

| | | | |
|---|---|---|---|
| 2,225,037 A | 12/1940 | Dake | |
| 2,388,673 A * | 11/1945 | Brown | 359/420 |
| 2,512,153 A | 6/1950 | Henyey et al. | |
| 2,527,719 A | 10/1950 | Greenstein et al. | |
| 3,339,450 A * | 9/1967 | Reed | 356/254 |
| 3,992,782 A * | 11/1976 | Rickert | 42/120 |
| 5,084,780 A | 1/1992 | Phillips | |
| 5,161,051 A | 11/1992 | Whitney et al. | |
| 5,349,469 A | 9/1994 | Francis | |
| 5,383,278 A * | 1/1995 | Kay | 33/265 |
| 5,652,679 A * | 7/1997 | Freeman | 359/731 |
| 5,877,902 A | 3/1999 | Sauter | |

(Continued)

FOREIGN PATENT DOCUMENTS

| | | |
|---|---|---|
| EP | 0234180 A1 | 9/1987 |
| EP | 2 557 450 A1 | 2/2013 |
| WO | WO 2012/058453 A2 | 5/2012 |

OTHER PUBLICATIONS

Wikipedia, Holographic Weapon Sight, en.wikipedia.org/wiki/Holographic_weapon_sight, published Jan. 28, 2013, 2 pages.

(Continued)

*Primary Examiner* — Samir Abdosh
(74) *Attorney, Agent, or Firm* — Stoel Rives LLP

(57) ABSTRACT

A system for aiming a projectile weapon includes a telescopic sight for use with a second sighting device, such as a reflex sight or other non-magnifying sight. The telescopic sight has an eye point spaced apart rearwardly from its eyepiece and positioned at a vertical plane containing a line of initial trajectory of the weapon to which the aiming system is mounted so that a line parallel to the line of initial trajectory does not intersect the eyepiece. The location of the eye point facilitates concurrent use of a second sighting device at a normal mounting height and viewable past the eyepiece, thereby allowing the viewer to change views between the telescopic sight and the second sighting device with little eye movement and essentially no head movement.

27 Claims, 11 Drawing Sheets

(56) References Cited

U.S. PATENT DOCUMENTS

| | | | |
|---|---|---|---|
| 6,005,711 A | 12/1999 | Mai et al. | |
| 6,487,809 B1 | 12/2002 | Gaber | |
| 6,598,333 B1 * | 7/2003 | Randazzo et al. | 42/127 |
| 6,608,298 B2 | 8/2003 | Gaber | |
| 7,827,723 B1 | 11/2010 | Zaderey et al. | |
| 2011/0035980 A1 * | 2/2011 | Raviv et al. | 42/1.02 |
| 2011/0041377 A1 | 2/2011 | Thomas et al. | |
| 2011/0067288 A1 | 3/2011 | Hakansson et al. | |
| 2011/0232152 A1 * | 9/2011 | Thomas et al. | 42/125 |
| 2013/0008072 A1 * | 1/2013 | Chung | 42/113 |

OTHER PUBLICATIONS

L-3 Communications, EOTech Holographic Weapons Systems, HHS II, www.eotech-inc.com/products/sights/hhs2, visited Mar. 7, 2013, 2 pages.

European Search Report dated May 19, 2014 for European Application No. 14160137.7.

* cited by examiner

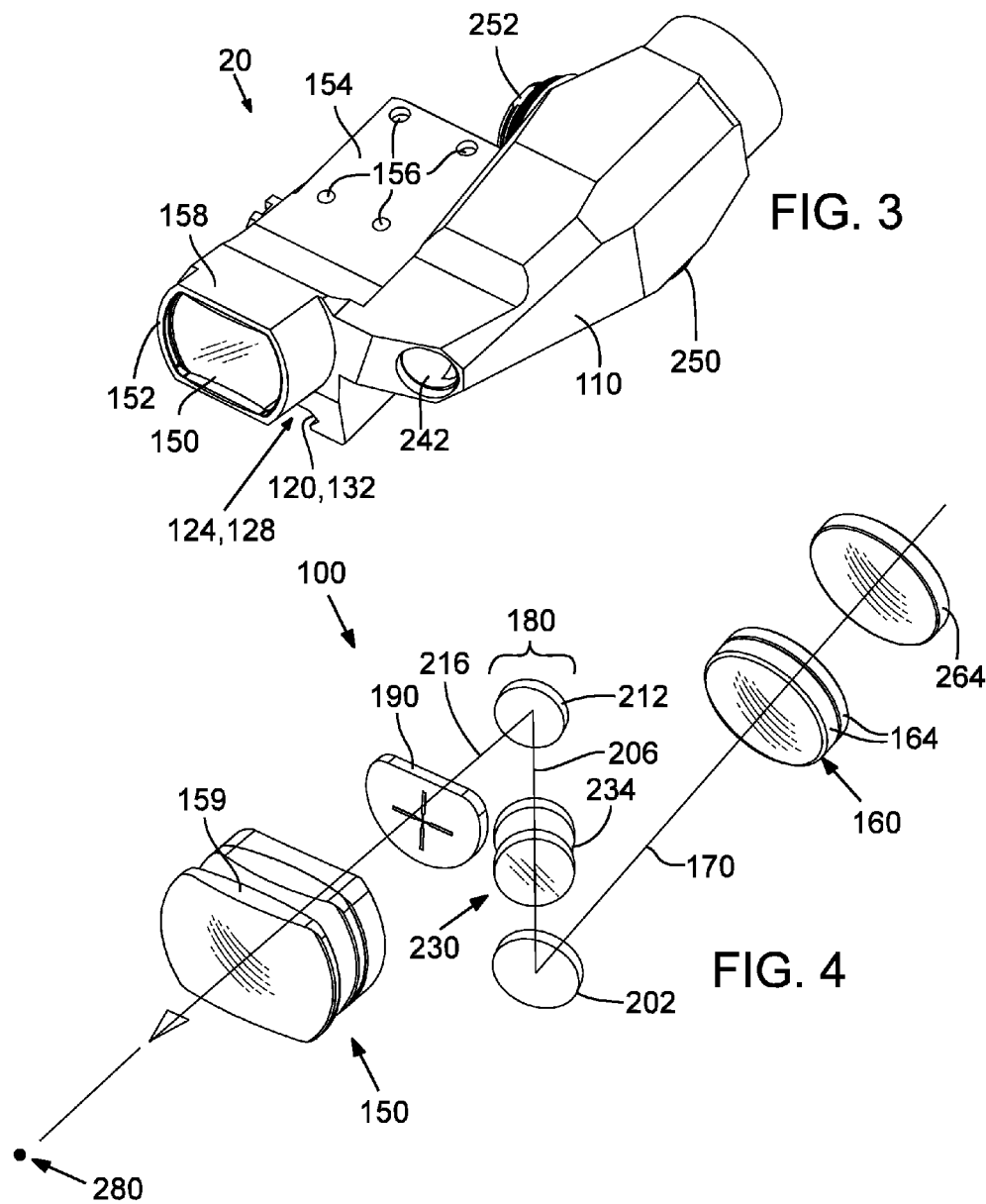

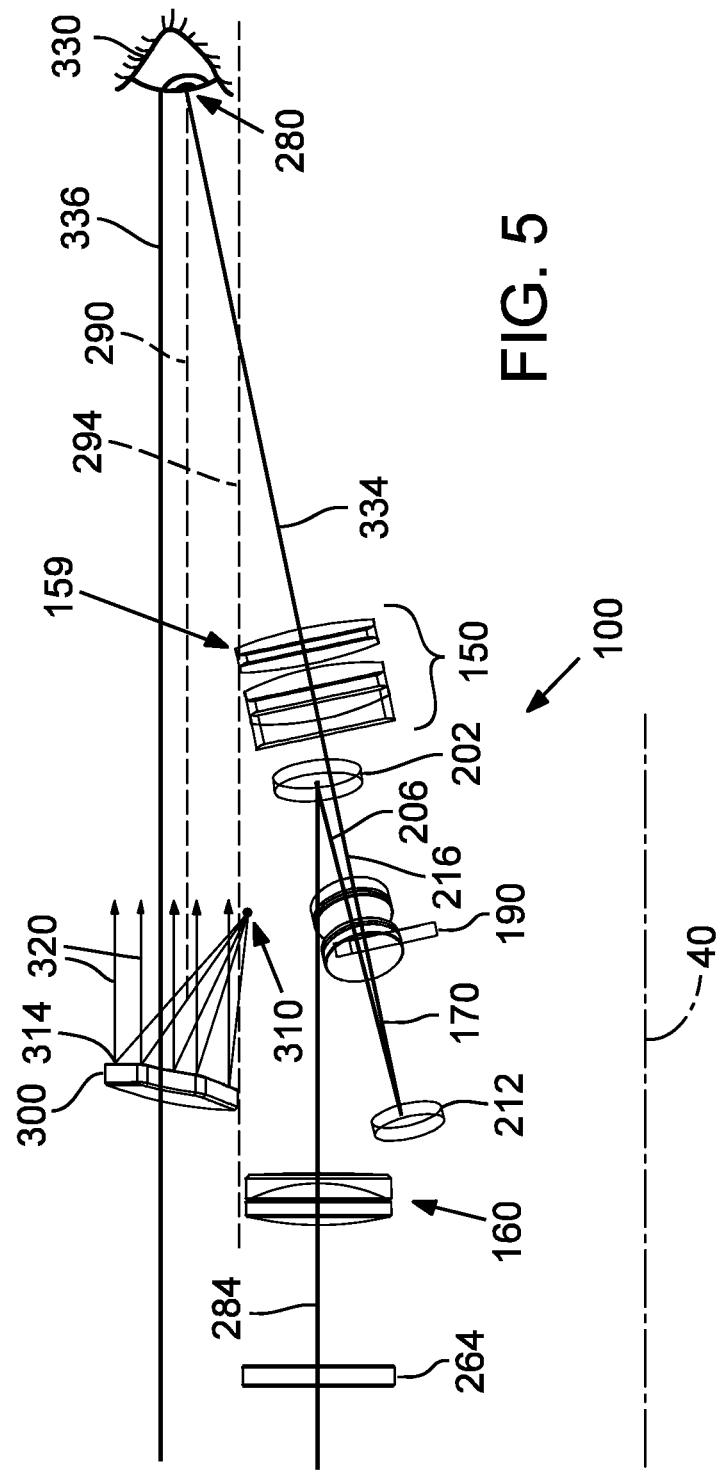

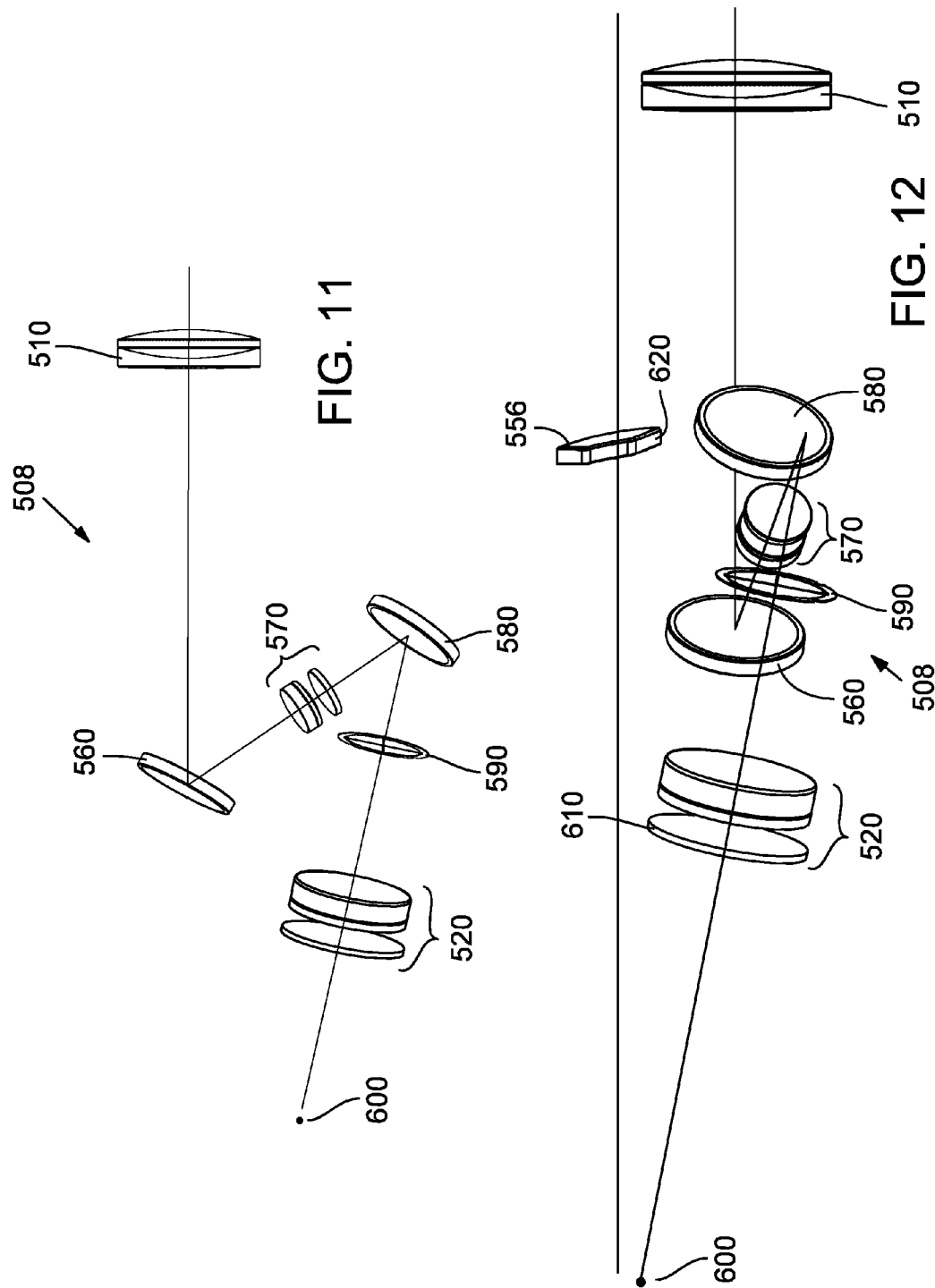

ic sights
DUAL FIELD OPTICAL AIMING SYSTEM FOR PROJECTILE WEAPONS

TECHNICAL FIELD

The field of the present disclosure relates to sighting systems for projectile weapons and, more particularly, to a telescopic sight designed for use with a reflex sight or other non-magnifying sight.

BACKGROUND

Conventional riflescopes and other telescopic sights accomplish magnification changes by optical elements that are either movable along the optical path, or that are switched into and out of the optical path. Also known are sight designs utilizing switching mirrors and/or beam splitters for switching between one of two different optical systems alternately viewable through a common eyepiece. Some sights include optical paths for day and night operation, including visible and infrared channels, which may be combined and superimposed for viewing as a composite image. In many of these systems, components of the sight must be manually moved to switch between viewing modes, which makes the sight more complicated, prone to image instability or misalignment, cumbersome and slow for switching between modes, and prone to making noise.

U.S. Pat. No. 2,388,673 of Brown, U.S. Pat. No. 2,512,153 of Henvey et al., and U.S. Pat. No. 2,527,719 of Greenstein et al. describe dual optical power split-field telescopic sights utilizing different lenses or lens segments for upper and lower portions of the optical system. These telescopic sights utilize complex lens systems and optical prescriptions, and are limited by a shared eyepiece through which both fields are simultaneously viewed.

The present inventors have recognized a need for an aiming system that facilitates viewing a target scene through a telescopic sight and through a second sight having a different field of view or aiming capability, such as a non-magnifying reflex sight providing a wide field of view, very little field obstruction, and fast target acquisition. Various known systems utilize a miniature reflex sight (also known as a red-dot sight) mounted atop a telescopic sight, but the height of the viewing region of the reflex sight in such systems is generally much higher than the exit pupil of the telescopic sight and too high for achieving a cheek weld with the rifle stock (buttstock) as is desirable for stable aiming. Substantial head movement is also needed to switch between the two sights. The required head movement can be cumbersome and slow, particularly when switching from the reflex sight to the telescopic sight and re-aligning the eye with the typically small exit pupil of the telescopic sight.

SUMMARY

In accordance with the present disclosure, a telescopic sight of a projectile weapon aiming system includes a housing supporting an optical system of the telescopic sight relative to a mounting surface of the sight, which may include an integrated mounting bracket or clamp at least partly formed in the housing. An objective of the optical system is horizontally offset relative to a vertical plane containing a line of initial trajectory of the projectile weapon when the telescopic sight is mounted to the projectile weapon. A light redirection device, such as a prism system or set of mirrors, receives light from the objective and causes an image of the field of view formed at a focal plane to be horizontally offset from the objective. In some embodiments, the light redirection device includes a first reflective surface that receives light from the objective and reflects it forwardly along a first path segment toward a second reflective surface that reflects the light rearward along a second path segment that is angled upwardly away from the line of initial trajectory when the telescopic sight is mounted to the weapon.

An eyepiece of the telescopic sight is positioned rearward of the focal plane and defines an eye point spaced apart rearwardly from the eyepiece at which the image of the field of view is visible through the eyepiece. The eye point is located in the vertical plane with the line of initial trajectory and on a line parallel to the line of initial trajectory that does not intersect the eyepiece. The eye point facilitates concurrent use of a second sighting device, such as a non-magnifying reflex sight or holographic weapon sight, that may be viewable past the eyepiece, thereby allowing the viewer to change views between the telescopic sight and the non-magnifying sight with little eye movement and essentially no head movement. It may also enable a shooter to change views between the two sights without breaking cheek weld with a stock of the weapon.

The non-magnifying sight and telescopic sight may be independently mountable in tandem on a common mounting rail of the projectile weapon. Alternatively, the telescopic sight may include a mounting platform that facilitates mounting a reflex sight on the telescopic sight at essentially the same level as the eye point so that a centroid of a viewing window (partial reflector) of the reflex sight is approximately 1.3 to 1.75 inches above a top surface of the mounting rail. Other mounting arrangements may also be possible.

Reticles and alignment subsystems of the telescopic sight for aim point indication and point of aim adjustment (sighting-in) are also disclosed.

Additional aspects and advantages will be apparent from the following detailed description of preferred embodiments, which proceeds with reference to the accompanying drawings.

BRIEF DESCRIPTION OF THE DRAWINGS

FIG. 3 is an isometric view of the telescopic sight component of the aiming system of FIGS. 1-2, with the rifle and reflex sight omitted to show detail;

FIG. 4 is an isometric view of an optical system of the telescopic sight of FIG. 3, annotated to trace an optical path of the telescopic sight;

FIG. 5 is a left side elevation view of the optical system of the aiming system of FIGS. 1 and 2 and illustrating the optical path of the telescopic sight and lines of sight from an eye point;

FIG. 11 is a top plan view of an optical system of the aiming system of FIGS. 8-10, with a reflex sight viewing window omitted;

FIG. 12 is a right side elevation view of the optical system of FIG. 11, together with a viewing window of a reflex sight of the aiming system of FIGS. 8-10;

DETAILED DESCRIPTION OF PREFERRED EMBODIMENTS

Figure 1:
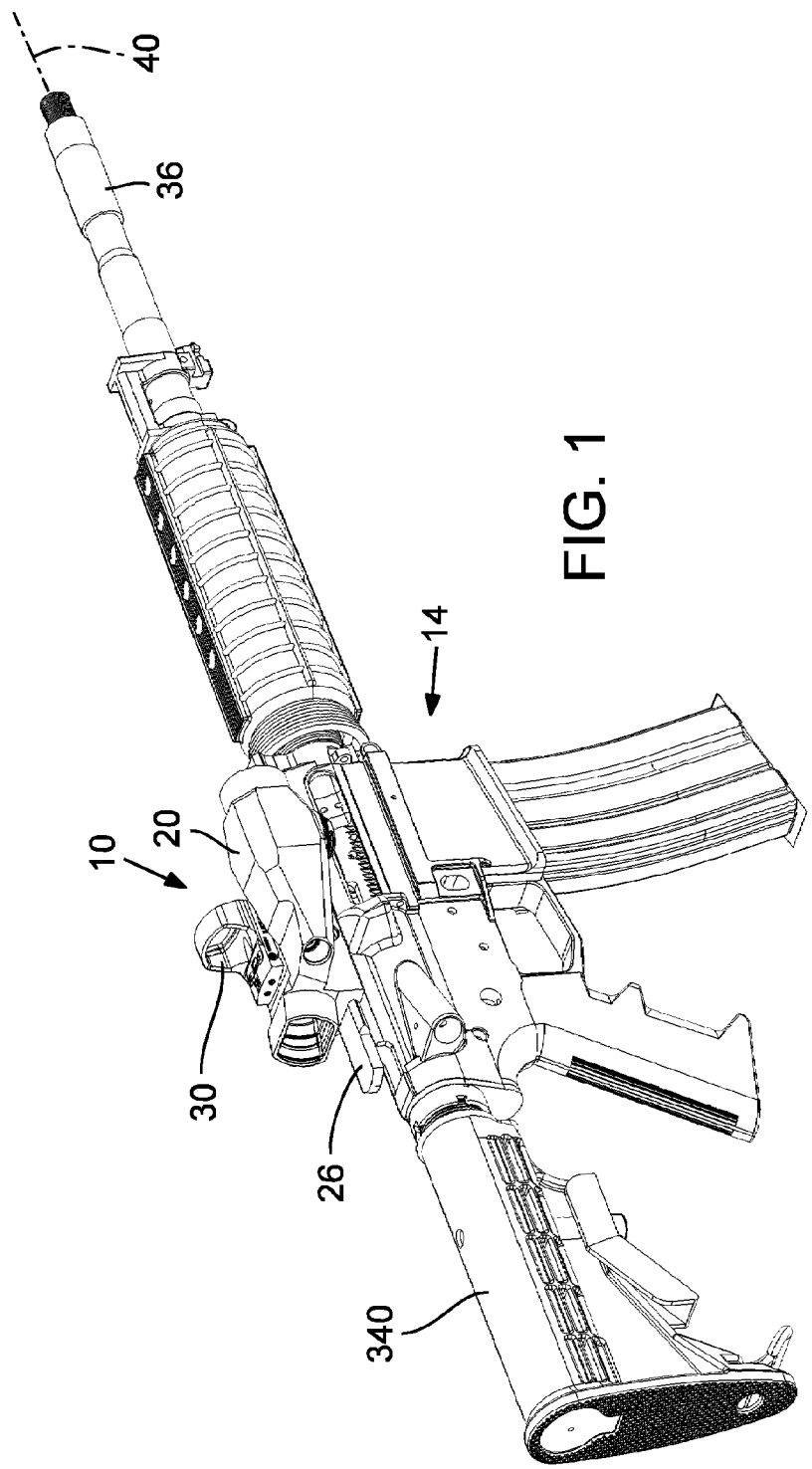
FIG. 1 is a rear right side isometric view of an optical aiming system including a telescopic sight shown mounted to a rifle and a reflex sight mounted atop the telescopic sight, according to a first embodiment.
Figure 2:
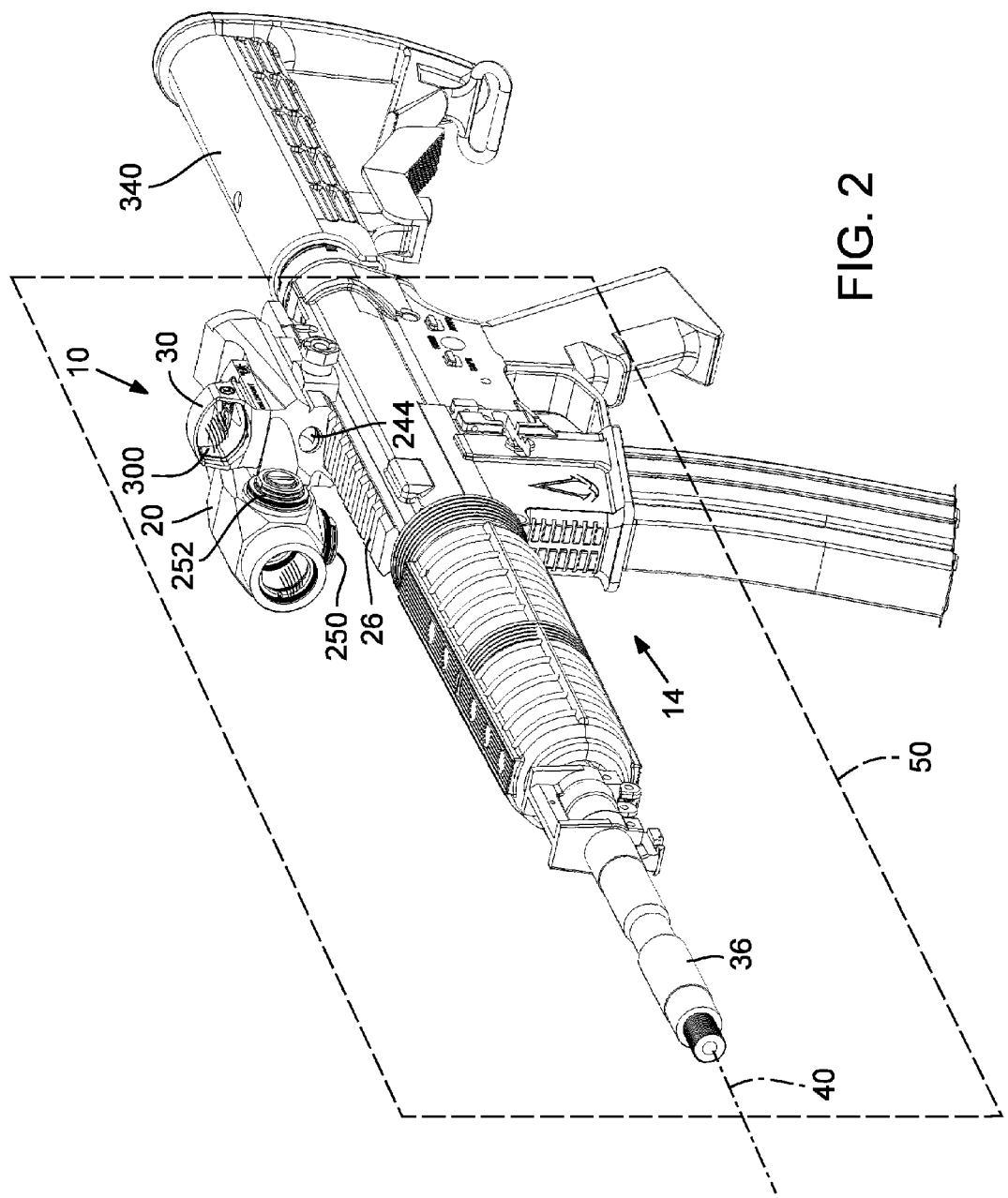
FIG. 2 is a front left side isometric view of the aiming system and rifle of FIG. 1.

FIGS. 1 and 2 illustrate an optical aiming system 10 according to a first embodiment, shown mounted to a rifle 14. Aiming system 10 includes a telescopic sight 20 mounted to a mounting rail 26 of rifle 14, which may comprise a Picatinny rail (also known as a MIL-STD-1913 rail), which is a universal dovetail-shaped mounting rail commonly found on AR-15 rifles and other tactical rifles. In the embodiment illustrated in FIGS. 1 and 2, a non-magnifying reflex sight 30 is mounted atop telescopic sight 20. Telescopic sight 20 and non-magnifying sight are mounted in alignment with a bore of a barrel 36 of rifle 14, defining a line of initial trajectory 40 of rifle 14. Line of initial trajectory 40 lies within a vertical plane 50 (FIG. 2) that also longitudinally bisects mounting rail 26. As further described below with reference to FIGS. 3 and 4, an objective 160 of telescopic sight 20 is laterally offset (i.e. horizontally offset) relative to vertical plane 50.

It should be understood that the term "vertical plane" is used herein merely as convenient terminology for a frame of reference, and not to limit plane 50 to being exactly vertical relative to the horizon or gravity (i.e. plumb), even though when a rifle is in use the line of initial trajectory 40 and mounting rail 26 will desirably be arranged in a vertically stacked relationship as illustrated and described. As is known in the art, rifle 14 and aiming system 10 can be canted to the side together, thereby tilting vertical plane 50, albeit potentially impacting bullet drop compensation and parallax compensation functions of a reticle 190, 700 (FIGS. 4 and 13) of aiming system 10 described below. Also, aiming system 10 may be mounted on a side rail (not shown) or other non-standard mount that is not perfectly centered or horizontal relative to a normal shooting position. Moreover while the position of mounting rail 26 relative to vertical plane 50 is a common attribute of a tactical rifle, it should be understood that mounting rail 26 or other mounting features or surfaces of a projectile weapon may not necessarily be centered on vertical plane 50. Thus, unless expressly stated in the claims, the use of the term "vertical plane" is not alone intended to limit the scope of the invention to an arrangement in which a mounting rail or other mounting features have the same shape or position as mounting rail 26 to the projectile weapon or to vertical plane 50, or to an exact placement of the vertical plane relative to mounting rail 26. As discussed below, the position of vertical plane 50 is determined in part by the line of initial trajectory 40 of the projectile weapon and in part by the location of an eye point 280 (FIGS. 4 and 5) of the telescopic sight 20.

FIG. 3 is an isometric view of telescopic sight 20 of aiming system 10, with reflex sight 30 removed, and FIG. 4 is an isometric view of an optical system 100 of telescopic sight. With reference to FIGS. 3 and 4, telescopic sight 20 includes a housing 110 that supports optical system 100 relative to a mounting surface 120 of housing 110. In the embodiment shown, mounting surface 120 comprises surfaces of a mounting clamp 124 (FIG. 7) having a longitudinal dovetail shaped slot 128. A fixed portion 132 of clamp 124 includes longitudinal reference surfaces providing primary lateral aiming alignment of telescopic sight 20 relative to mounting rail 26. Preferably, these reference surfaces and the entirety of fixed portion 132 are integrally formed directly in housing 110, by machining from stock material or otherwise. A movable portion of clamp 124 is formed by a clamp shoe 134 illustrated in FIG. 7, which is retained to fixed portion 132 by coupling bolt 136. In other embodiments, mounting surface 120 may take other shapes and forms providing a solid platform or reference that, with mounting rail 26 or other scope mount, precisely aligns telescopic sight 20 and optical system 100 relative to rifle 14 when telescopic sight 20 is mounted thereon. For example, in a conventional riflescope housing, the outer longitudinal surface of a main tube of the scope serves as the mounting surface, which is engaged by mounting rings that are secured to a mounting base on the gun's receiver. The term mounting surface may also encompass multiple surfaces on housing 110 that may or may not lie in a common plane, but achieve alignment of telescopic sight 20 using other mounting devices.

With reference to FIG. 3, an eyepiece 150 of optical system 100 is supported by housing 110 at a rearward opening in eyepiece end 152 thereof. When telescopic sight 20 is mounted on rifle 14, eyepiece 150 is aligned with vertical plane 50 (FIG. 2), such that an optical axis of eyepiece 150 is contained in vertical plane 50. In some other embodiments, such as those illustrated in FIGS. 8-10 discussed below, the optical axis of eyepiece 150 is not contained in vertical plane 50 but intersects vertical plane 50. Housing 110 also includes an auxiliary sight mounting platform 154 including a set of threaded mounting holes 156 formed on a top outer surface of housing 110 forward of eyepiece 150. Auxiliary sight mounting platform 154 is horizontal and is centered on and intersects vertical plane 50 when telescopic sight 20 is mounted on rifle 14. Auxiliary sight mounting platform 154 is preferably recessed horizontally below a top surface 158 of eyepiece end 152 of housing 110 (facing away from line of initial trajectory 40) and below an uppermost edge 159 (FIG. 4) of eyepiece 150 to position a miniature reflex sight or other non-magnifying sight or auxiliary sighting device at a desired or optimal height, as further explained below. Top surface 158 of eyepiece end 152 may be flat, following the contour of an uppermost edge 159 of eyepiece 150 in which a top segment of round eyepiece lenses are removed to provide a clear line of sight for use of reflex sight 30, as further described below with reference to FIG. 5.

Continuing with reference to FIGS. 3 and 4, optical system 100 includes an objective 160 comprising objective lenses 164, which gather and focus light at a first (front) focal plane (FFP, not illustrated). In another embodiment (not shown), objective 160 may comprise a reflector or other suitable objective system. Objective 160 is offset horizontally relative to an eyepiece 150 of optical system 100 in the embodiment illustrated. A folded optical path 170 of optical system 100 extends from objective 160 to eyepiece 150. The folded aspect of optical path 170 is created by a light redirection device 180 that receives light from objective 160 and causes an image of the field of view formed at a rear focal plane (RFP) (located approximately at the plane of an aiming reticle 190 of optical system 100) to be offset horizontally from objective 160. In particular, in the embodiment illustrated, light redirection device 180 includes a first reflective surface consisting of a first mirror 202 that receives light from the objective 160 and reflects it forwardly along a first path fold segment 206 toward a second reflective surface consisting of a second mirror 212. The first path fold segment 206 may be angled downwardly relative to an optical axis of objective 160 (wherein the optical axis of objective 160 is coincident with a segment of optical path 170 between objective 160 and first mirror 202), depending on the desired or required geometry of optical system 100. Second mirror 212 receives light reflected by first mirror 202 and reflects the light rearward along a second path fold segment 216 that is angled upwardly away from the line of initial trajectory 40 to eyepiece 150, as best shown in FIG. 5. The light propagating along second path fold segment 216 forms, at the RFP, an image of the field of view of telescopic sight 20. An erector system 230 including an image-erecting relay lens unit 234 positioned between objective 160 and eyepiece 150 erects an image of the field of view formed at FFP and focuses it at RFP. In the figures, backing caps supporting the mirrors 202, 212 are omitted, providing a view through openings 242, 244 (FIGS. 3 and 2, respectively) in housing 110 through which mirrors 202, 212 are installed.

In another embodiment (not illustrated), erector system 230 may include a power-varying relay lens system (zoom lens system) interposed between FFP and RFP and including at least one (and typically at least two or more) lens elements selectively movable along the optical path 170 to vary an optical magnification setting of telescopic sight 20. When a zoom lens system is utilized, the aiming reticle 190 is preferably located at front focal plane FFP to maintain a constant relationship between markings on reticle 190 and the target scene regardless of the magnification setting of the zoom lens system.

Although light redirection device 180 is illustrated as a pair of mirrors 202, 212, in other embodiments (not shown) light redirection device may comprise a prism including first and second reflective surfaces. A prism system may be an image-erecting prism system, in which case relay lens system 234 can be omitted, and image-carrying light from objective 160 may be first focused at the plane of reticle 190. In yet another embodiment, light direction device 180 includes an image sensor and an electronic image display device (not illustrated). In the case of an electronic image sensor and display combination, the image sensor would be located at a focal plane, namely either the focal plane of objective 160 (FFP) or a focal plane of the erector system 230, and the display would be located either at the focal plane of eyepiece 150 (rear focal plane RFP), or at the front conjugate of erector system 230. Alternatively, light redirection device 180 might include a type of light guide, such as a light pipe (e.g. a bundle of fine aligned optical fibers forming an image pipe), which may bend the optical path without folding it longitudinally.

One or more of objective lenses 164 are slidably supported on housing 110 for movement transversely of an optical axis of the objective lenses relative to other elements of optical system 100. In the embodiment illustrated, the lateral position of both objective lenses 164 is adjustable via elevation and windage adjustment screws 250, 252 (FIG. 3) that are supported on and extend through housing 110. In alternative embodiments, another kind of adjustment mechanism may be employed. Adjustment screws 250, 252 can be manually turned to drive objective lenses 164 in a direction transversely of (and preferably perpendicular to) their optical axis to thereby effect vertical and horizontal aiming adjustments to the line of sight of telescopic sight 20, for sighting-in the aim point of telescopic sight 20 or compensating for bullet drop and/or wind effects, as further described in U.S. Pat. No. 7,827,723 of Zaderey et al., issued Nov. 9, 2010. Because objective lenses 164 are movable, they are not sealed to the housing 110. Instead, a transparent sealing window 264 (illustrated in FIG. 4) is fixed to housing 110 forward of objective lenses 164 and hermetically seals an interior of housing 110. The horizontal offset of objective 160 relative to vertical plane 50 and mounting rail 26 enables elevation adjustment screw 250 to be positioned on an underside of housing 110 while remaining accessible for adjustment via a coin or screwdriver, which further enhances the low profile nature of telescopic sight 20 and avoids elevation adjustment screw 250 from inhibiting the unaided (naked eye) field of view past housing 110.

A left side elevation view of optical system 100 is illustrated in FIG. 5 together with optical elements of reflex sight 30. With reference to FIGS. 4 and 5, eyepiece 150 is positioned rearward of rear focal plane RFP (coplanar with reticle 190) and defines an eye point 280 spaced rearwardly of eyepiece 150 at which the image of the field of view formed at RFP is visible through eyepiece 150. First path fold segment 206 is angled downwardly toward second mirror 212 relative to an optical axis 284 of objective 160. Second mirror 212 receives the light reflected by first mirror 202 and reflects the light rearward along second path fold segment 216, which is angled upwardly away from initial line of trajectory 40 and toward a horizontal plane containing the optical axis 284 of objective 160. This down and up folded optical path 170 assists in lowering the position of eyepiece 150 relative to the weapon. In the embodiment illustrated, optical path 170 is folded in both the horizontal and vertical axes, though in other embodiments (not illustrated), optical path 170 may be folded only horizontally or in only a vertical plane 50.

When telescopic sight 20 is mounted to rifle 14, eye point 280 is located at a place on vertical plane 50 (FIG. 2) such that a line 290 (FIG. 5) parallel to the line of initial trajectory 40 and intersecting eye point 280 does not intersect eyepiece 150. In the embodiment illustrated in FIGS. 1-7, eyepiece 150 is truncated and flat along its uppermost edge 159 (i.e., a round lens that has been cut, ground, or otherwise truncated or relieved to remove a section) to allow a clear horizontal line of sight from eye point 280 through a viewing window 300 of reflex sight 30 mounted forwardly of eyepiece 150. The truncated uppermost edge 159 of eyepiece may also enable a relatively large range of eye positions for use of reflex sight (beyond eye point 280), which may facilitate fast target acquisition in close-quarter tactical situations. Eye point 280 is preferably located just above a horizontal plane 294 tangent to uppermost edge 159 of eyepiece 150, which faces away from line of initial trajectory 40 when telescopic sight 20 is mounted to rifle 14 or another projectile weapon. Skilled persons will appreciate that eye point 280 may be any point within an exit pupil of telescopic sight 20 at which a viewer's eye 330 may be located to view the entire image of the field of view of telescopic sight 20.

Reflex sight 30 includes a light source 310, such as an LED, which is positioned near a focal point of viewing window 300, which is curved and includes a partial reflector in the form of a dichroic reflective surface 314. The dichroic reflective surface 314 of viewing window 300 selectively reflects the wavelength of illumination emitted by light source 310 while passing other wavelengths of light, so as to reflect collimated light 320 toward the viewer's eye 330 while allowing the viewer to see a distant target scene through viewing window 300. As is well known in the art, this arrangement results in an image of an aiming mark or reticle formed by light source 310 to appear focused at a distance forward of reflex sight 30 and superimposed on the target scene viewed through viewing window 300 to enable accurate aiming across a relatively wide range of head and eye positions at which the collimated light is received by the viewer's eye 330.

Viewing window 300 is positioned predominantly above the horizontal plane 294 when both reflex sight 30 and telescopic sight 20 are mounted to rifle 14, such that both telescopic sight 20 and reflex sight 30 can be used to aim rifle 14 with essentially no movement of the viewer's head. In practice, a small portion of the base of viewing window 300 may lie below horizontal plane 294, which will only slightly reduce the effective range of eye positions at which reflex sight 30 can be used for aiming. The shooter or viewer may easily change between a (magnified) viewing line of sight 334 of telescopic sight 20 and a non-magnified viewing line of sight 336 through reflex sight 30 merely by rotating the viewer's eye 330 within its socket and with essentially no head movement. Thus, in practice when switching between sights 20 and 30, the eye point 280 of telescopic sight 20 (along viewing line of sight 334) may be slightly below and spaced apart from an eye point of viewer's eye 330 when viewing through reflex sight along viewing line of sight 336. Alternatively, both sights 20, 30 may be viewed from coincident eye points. When the telescopic sight 20 and reflex sight 30 are mounted to mounting rail 26 of rifle 14, a centroid of the surface area of viewing window 300 is preferably located between 1.3 and 1.75 inches above mounting rail 26, and more preferably between 1.3 and 1.6 inches or between 1.4 and 1.5 inches above mounting rail 26, which is an ideal height for allowing a shooter to form a cheek weld with a stock 340 (FIG. 1) of rifle 14. Thus, telescopic sight 20 and reflex sight 30 may be sequentially used for aiming without breaking the cheek weld.

Figure 6:
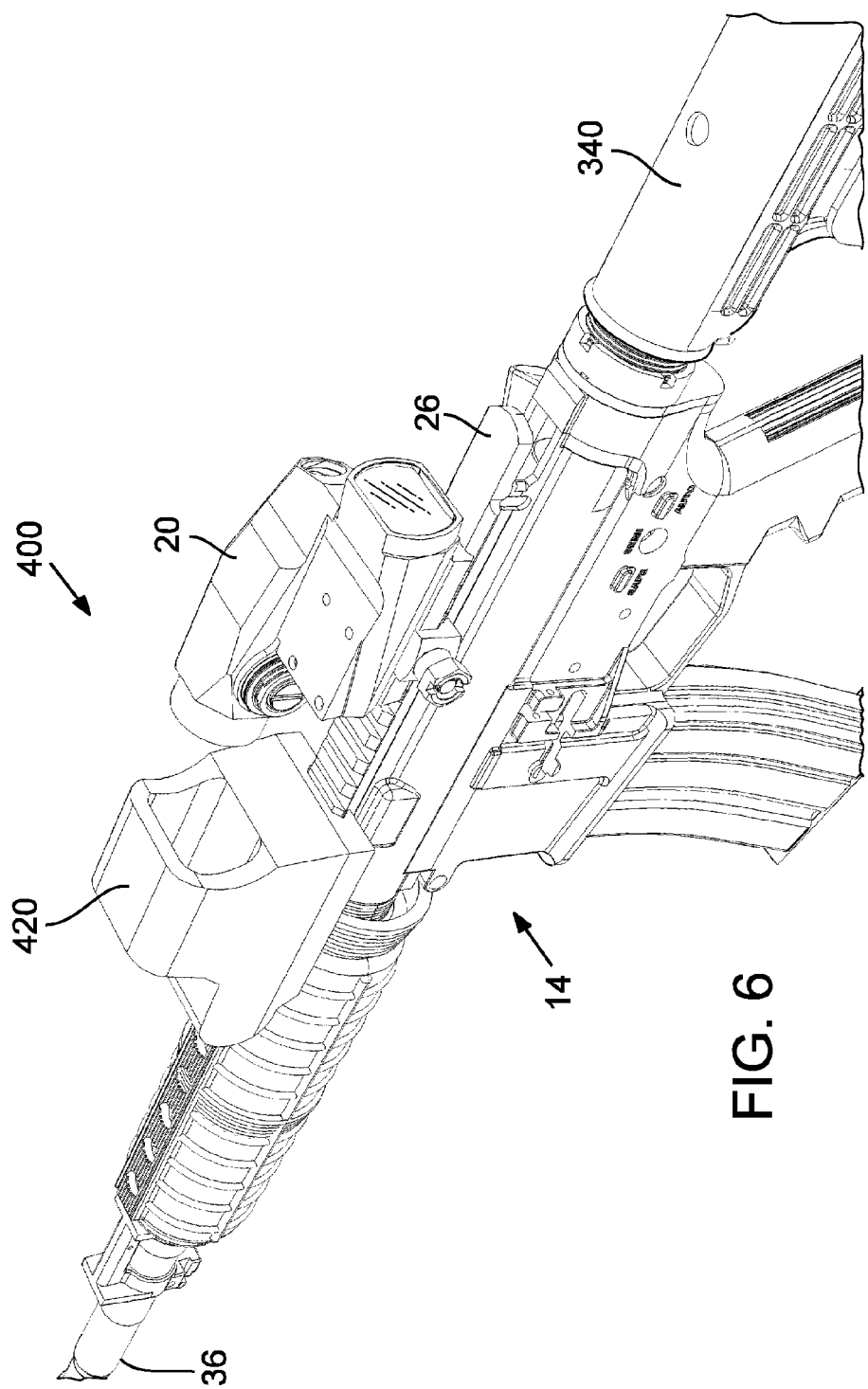
FIG. 6 is an isometric view of an optical aiming system including the telescopic sight of FIG. 4 and a holographic sight mounted to a common mounting rail of a rifle, according to another embodiment.

FIG. 6 illustrates an aiming system 400 according to another embodiment, in which a non-magnifying holographic weapon sight 420 and telescopic sight 20 are independently mounted to mounting rail 26 of rifle 14 in tandem. Holographic weapon sight may be any of a variety of holographic sights sold by EOTech, a subsidiary of L-3 Communications located in Ann Arbor, Mich. In the tandem mounting arrangement, each of telescopic sight 20 and holographic weapon sight 420 is separately removable and mountable to the common mounting rail 26 independently of the other. In this arrangement, the sights are independently sighted in. The sights can be targeted at different sighted-in ranges. Or if a common sighted-in range is desired, the second one of the sights to be mounted can be sighed in merely by positioning its aiming mark at the same place on the target scene as the other sight, which has been previously sighted-in.

Figure 7:
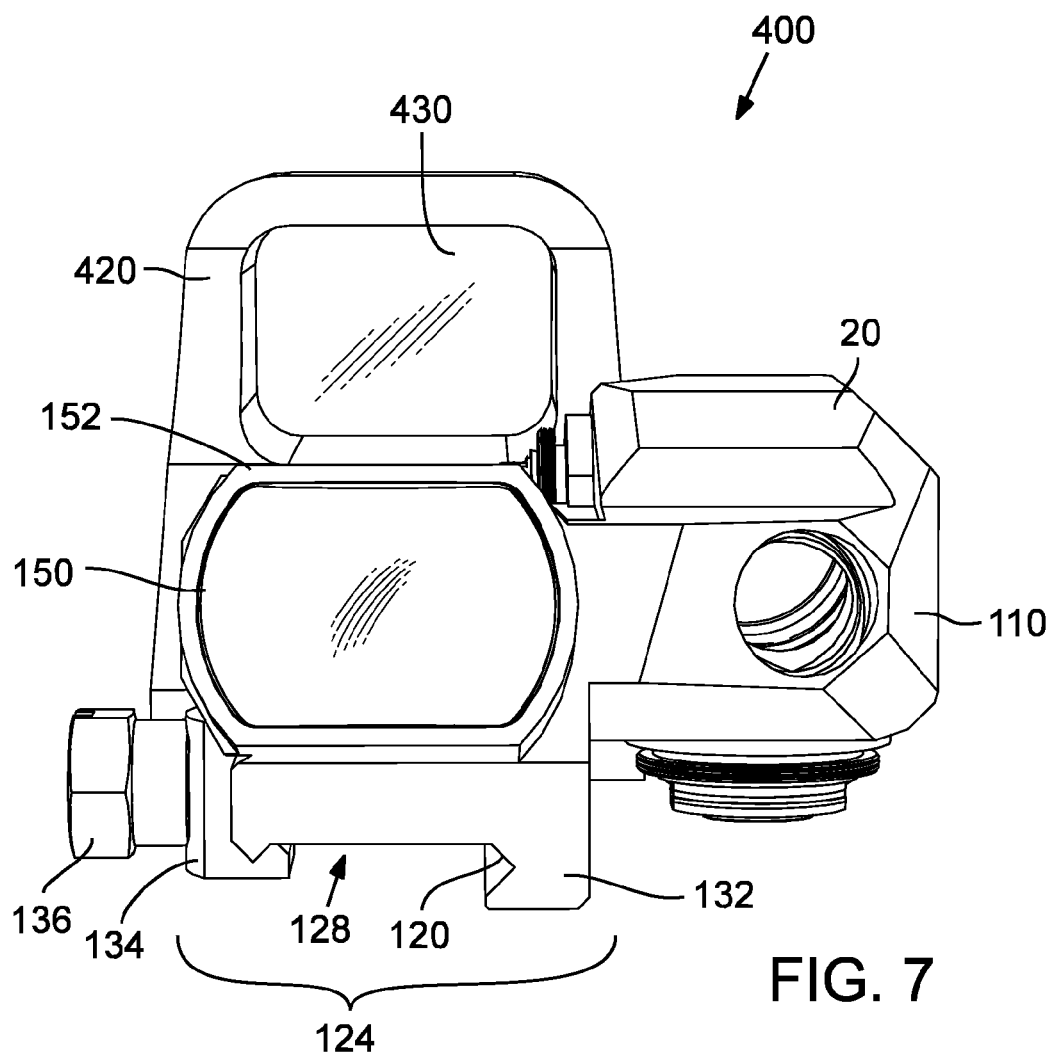
FIG. 7 is a rear perspective view of the optical aiming system of FIG. 6 with the rifle omitted.

FIG. 7 is a rear perspective view of aiming system 400 illustrating how a viewing window (optic 430) is in a vertically stacked relationship with eyepiece 150. In practice, the fields of view of telescopic sight 20 and the non-magnifying sight (either holographic weapon sight 420, or in the embodiment of FIGS. 1-7, reflex sight 30) may be stacked directly adjacent each other to form a composite image in which the top portion of the composite image is a wide-field of view of the scene with no magnification and the bottom portion of the composite image is a narrow field of view of a magnified image of the same scene of the distant target. In some embodiments, the two images may be slightly spaced apart or divided by an edge of eyepiece end 152 of housing 110 to provide a distinct separation between images and avoid confusion.

Other types of non-magnifying sights may also be utilized with telescopic sights according to the present disclosure. For example, reflex sights having a collimated light source and a flat partially reflective viewing window may be utilized. Still other non-magnifying sights, such as iron sights, may be usable with telescopic sights and aiming systems (including a secondary reflex sight or other non-magnifying sight). Mounting a non-magnifying sight, such as reflex sight 30 or holographic weapon sight 420, at a normal mounting height in the range of 1.3 to 1.75 inches enables the user to co-witness the non-magnifying sight with conventional iron sights (not illustrated), which may include a front iron sight located forward of aiming system 10 toward a muzzle end of barrel 36, and a rear iron sight located behind the front iron sight and behind or forward of aiming system 10.

Skilled persons will appreciate that the aiming systems 10 and 400 of FIGS. 1-7 are right-handed and designed to be viewed using the shooter's right eye, and their configuration provides a right-handed shooter with little impediment to viewing the target scene with a naked left eye. However, if the same aiming systems 10 and 400 were to be used by a left-handed shooter, the objective 160 and the portion of housing 110 associated therewith would tend to block the unaided field of view of the shooter's right eye. A left-handed embodiment of the aiming systems (not shown) is also contemplated, in which the objective 160 is horizontally offset to the left of the vertical plane 50.

Figure 8:
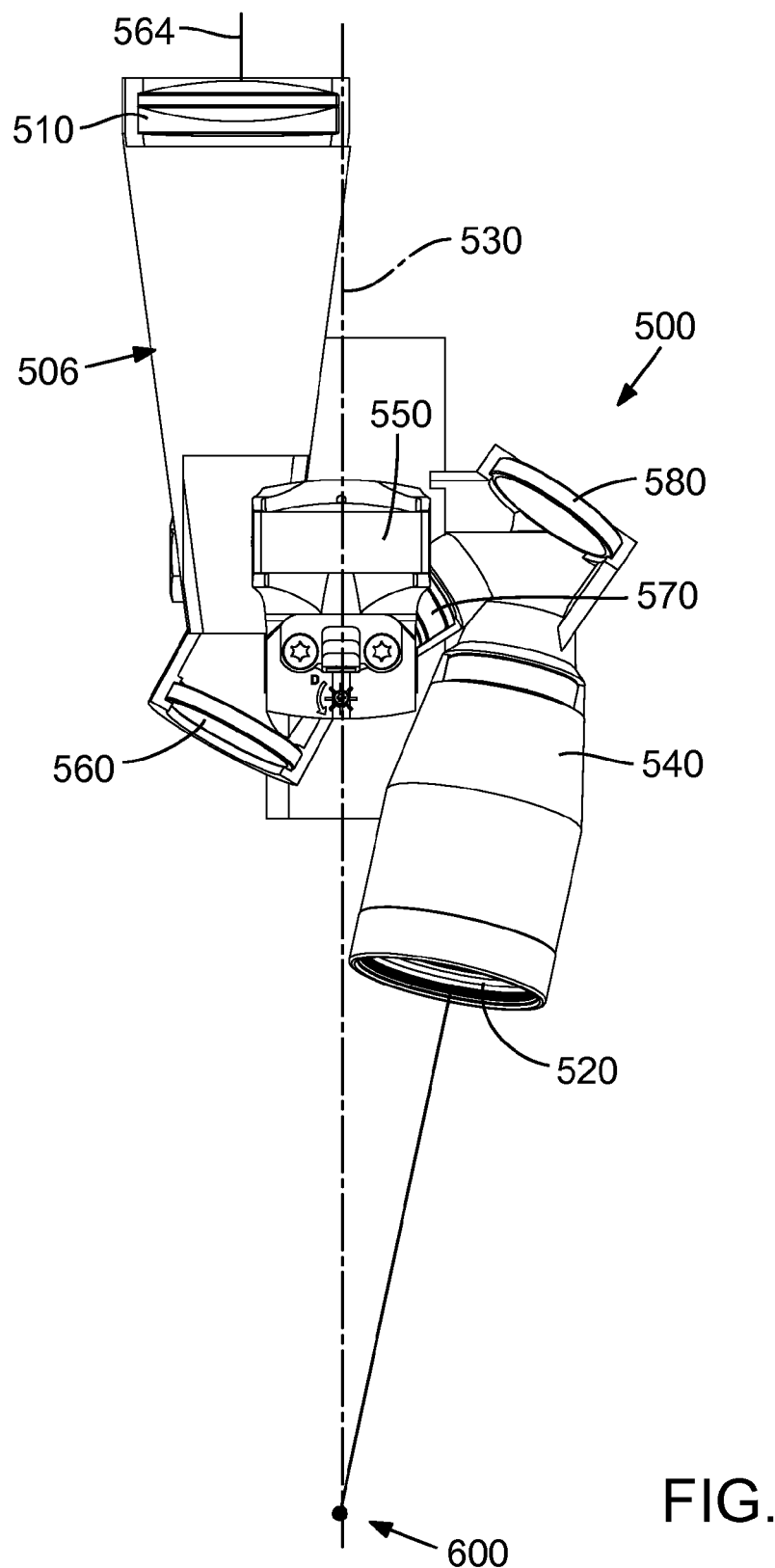
FIGS. 8, 9 and 10 are respective top plan, right side elevation, and eyepiece end views of an optical aiming system according to yet another embodiment.
Figure 9:
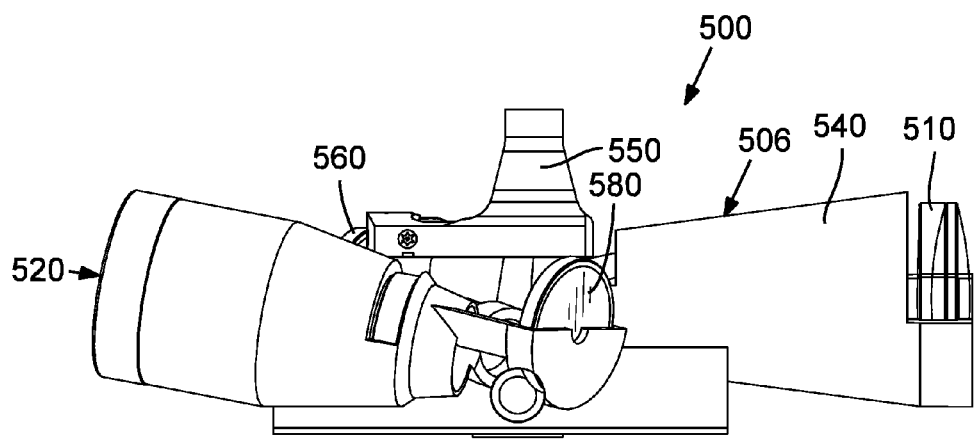
Figure 10:
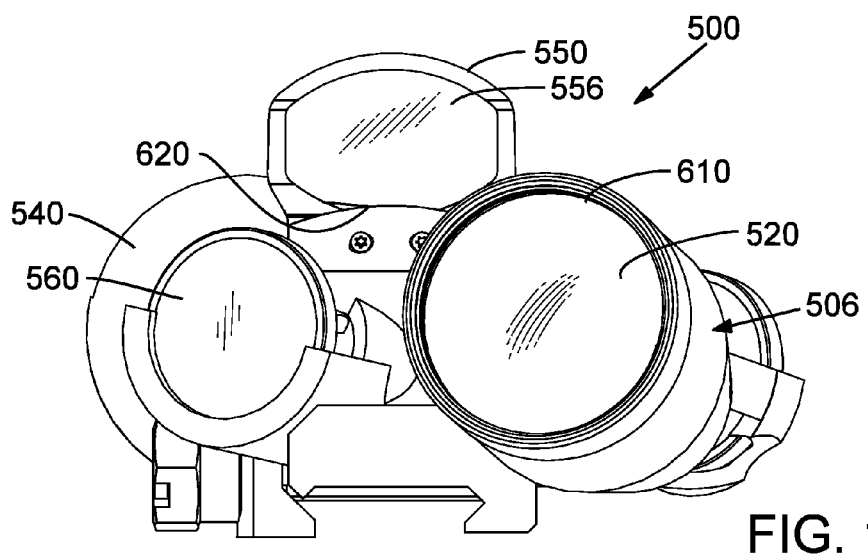

FIGS. 8, 9 and 10 show respective top, right side, and eyepiece end views of an aiming system 500 according to yet another embodiment, including a telescopic sight 506 having an objective 510 offset laterally to the left of a vertical plane (illustrated by centerline 530 in FIG. 8) and an eyepiece 520 offset laterally to the right of vertical plane 530. Portions of a housing 540 of telescopic sight 506 are cut away to reveal portions of an optical system 508 of telescopic sight 506. FIG. 11 is a top view of optical system 508 of telescopic sight, and FIG. 12 is a side elevation view of optical system 508. FIG. 12 also illustrates a viewing window 556 of a reflex sight 550 of aiming system 500.

With reference to FIGS. 8-12, reflex sight 550 is mounted along a central portion of the housing 540 of telescopic sight 506 between objective 510 and eyepiece 520. A first mirror 560 receives light from objective 510 and reflects it forwardly and across vertical plane 530 and at a slight downward angle relative to the optical axis 564 of objective 510 through an image-erecting reflex lens unit 570 to a second mirror 580. Second mirror 580 reflects the light rearward and toward vertical plane 530 to a rear focal plane (RFP) located at or near a reticle 590 (FIGS. 11 and 12). Eyepiece 520 defines an eye point 600 rearward of eyepiece 520 at which the image at the RFP is visible. The eye point 600 is located at a place on vertical plane 530 such that a line parallel to the initial line of trajectory (not illustrated) extends through viewing window 556 of reflex sight and does not intersect eyepiece 520. Due to the lateral offset of eyepiece 520, eye point 600 may, in some embodiments, be lower than a horizontal plane (not illustrated) tangent to an uppermost edge 610 (FIG. 12) of eyepiece 520, yet a horizontal line of sight intersecting eye point 600 and contained in vertical plane 530 does not intersect eyepiece 520. A similar lateral arrangement of eyepiece 520 may also enable reflex sight 550 to be mounted relatively low on telescopic sight 506 such that a lower edge 620 (FIG. 12) of viewing window 556 is vertically lower than the uppermost edge 610 of eyepiece 520 without occluding an effective field of view through viewing window 556, as best illustrated in FIG. 10.

In still other embodiments (not illustrated) a telescopic sight with a folded optical path may include a small diameter objective centered on the weapon (on vertical plane 530); and with an eyepiece that is laterally offset to the side of vertical plane 530, similarly to telescopic sight 506 of FIGS. 8-12. A small diameter objective may allow reflex sight to be mounted atop the telescopic sight while maintaining a height of a centroid of the viewing window of reflex sight at a height of between 1.3 and 1.75 inch above the mounting rail (not shown). Like the embodiment of FIGS. 8-12, the eyepiece is angled inwardly and upwardly to provide an eye point that allows both the telescopic sight and the reflex sight mounted thereon to be viewed from essentially the same head position and with little eye movement, and to provide other benefits described above with respect to FIGS. 8-12 while avoiding the parallax issues addressed by the reticle described below.

Figure 13:
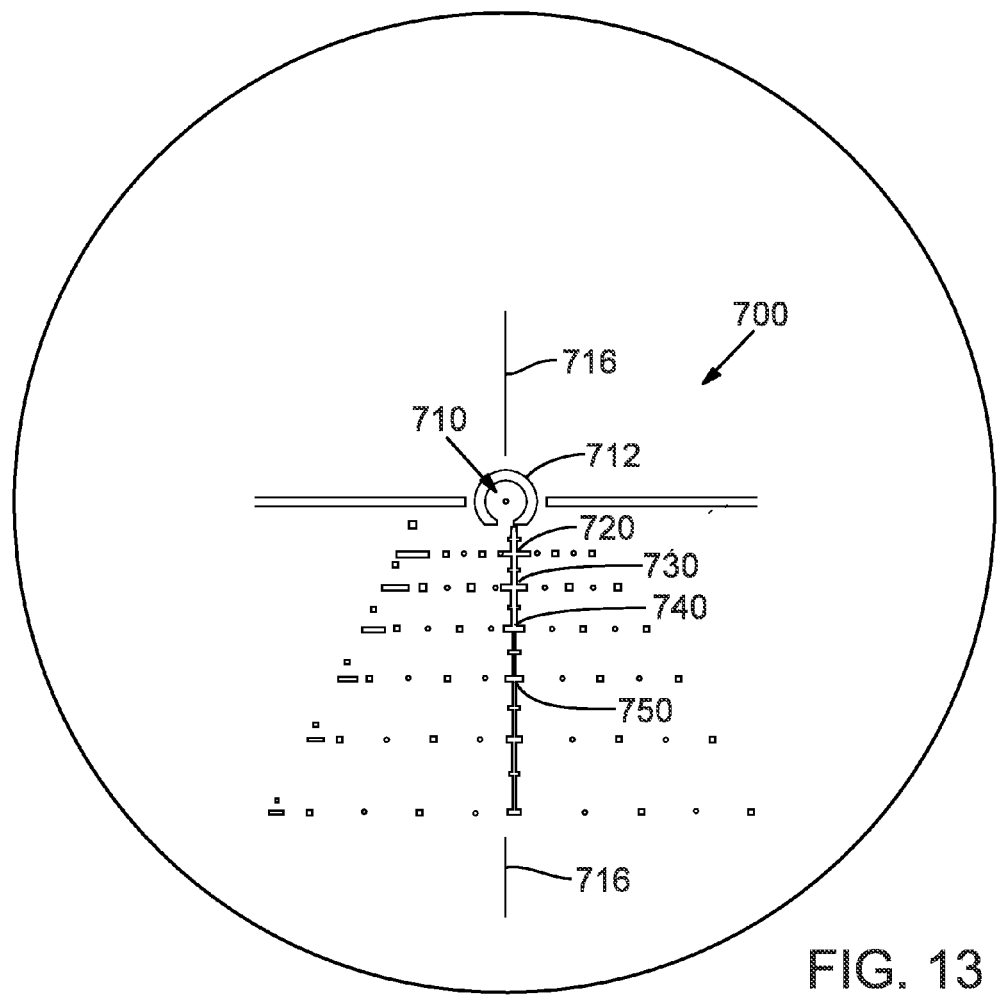
FIG. 13 is a view of a reticle of the telescopic sight of FIGS. 1-7.

FIG. 13 is a view of a reticle 700 usable in place of reticle 190 of telescopic sight 20 (FIGS. 4 and 5). With reference to FIG. 13, reticle 700 includes a primary aiming mark 710 at the center of a horseshoe shape 712. A vertical aiming axis (shown partially by dimension line 716, which forms no part of reticle 700) extends through aiming mark 710. Reticle 700 is designed so that, when telescopic sight 20 is sighted-in with primary aiming mark 710 accurately aiming at a point of impact of the projectile at the sighted-in distance (for example 100 or 200 yards), holdover aiming marks 720, 730, 740, 750 provide compensation for different ranges (e.g. 300, 400, 500, and 600 yards, etc.). Holdover aiming marks 720, 730, 740, and 750 are spaced below primary aiming mark 710 and laterally offset to the right side of vertical aiming axis to compensate for parallax induced by the horizontal offset of the objective 160 to the right of vertical plane 50 and line of initial trajectory 40 and an angled line of sight. More particularly, the position of reticle 700 in telescopic sight 20 (and particularly aiming marks 710, 720, 730, 740, and 750) cooperates with objective 160 to define a line of sight from objective 160 that is angled horizontally inward toward vertical plane 50 when telescopic sight 20 is mounted to rifle 14. Skilled persons will appreciate that this angled line of sight induces left-to-right parallax error at ranges different from the sighted-in range, compensated by laterally offsetting holdover aiming marks 720, 730, 740, 750 relative to vertical axis 716 of reticle 700, as discussed above. The position of holdover aiming marks 720, 730, 740, 750 may also be designed to compensate for spin-drift of the bullet at ranges beyond the sighted-in range.

Figure 14:
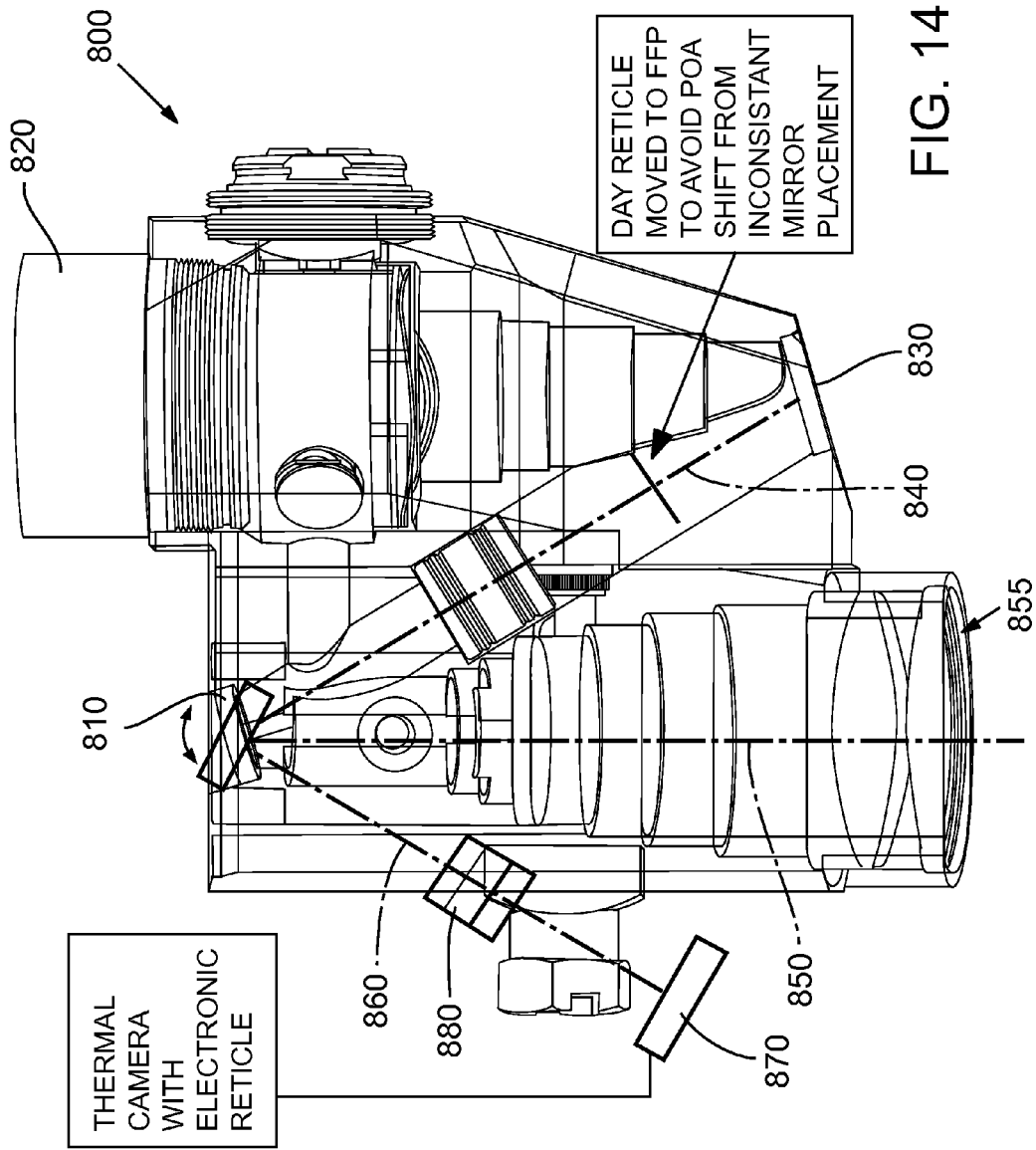
FIG. 14 is a top view of a telescopic sight with a pivoting mirror for switching the optical path to an auxiliary display.

FIG. 14 is a top view of a telescopic day/night sight 800 similar to telescopic sight of FIGS. 1-7, but in which a second mirror 810 is pivotable to switch the field of view of telescopic sight 800 between a day mode and a night mode. In day mode, the second mirror 810 is in a first position to receive visible light (which has been gathered by objective 820 and reflected by first mirror 830 along a first path fold segment 840) and to reflect the visible light along a second path fold segment 850 to a rear focal plane (RFP) for viewing via the common eyepiece 855. In night mode, the second mirror 810 is pivoted or otherwise moved to a second position, to receive light along a third optical path segment 860 from a display unit 870 of an auxiliary viewing device, such as a thermal imaging device, infrared scope, or other night vision sight, or from another type of video or image input device. In night mode, the image of the display is formed at RFP for viewing via eyepiece 855. A relay lens unit 880 (erector lenses) is provided in third optical path segment 860 between display unit 870 and second mirror 810. In some embodiments, telescopic day/night sight 800 be additionally utilized with a reflex sight or other non-magnifying sight (not illustrated).

It will be obvious to those having skill in the art that many changes may be made to the details of the above-described embodiments without departing from the underlying principles of the invention. For example, while the foregoing description of the aiming system 10 is presented in the environment of a tactical rifle, it should be understood that aiming systems and other aspects of the devices described herein may be used in conjunction with other projectile weapons, such as hunting rifles, handguns (pistols), shotguns, archery bows, crossbows, and grenade launchers, for example, and for other sighting needs unrelated to projectile weapons, such as observation, surveying, and the like. The scope of the present invention should, therefore, be determined only by the following claims.

The invention claimed is:

1. A projectile weapon aiming system, comprising:
   a telescopic sight including a housing having a mounting surface that facilitates mounting the telescopic sight on a projectile weapon in alignment with a line of initial trajectory of the projectile weapon, the housing supporting an optical system of the telescopic sight and positioning the optical system relative to the mounting surface, the optical system including:
      an objective horizontally offset relative to a vertical plane containing the line of initial trajectory when the telescopic sight is mounted to the projectile weapon;
      a light redirection device that receives light from the objective and produces at a focal plane an image of a field of view of the telescopic sight, the image being horizontally offset from the objective; and
      an eyepiece positioned rearward of the focal plane and defining an eye point spaced apart rearwardly from the eyepiece at which the image of the field of view is visible through the eyepiece, wherein, when the telescopic sight is mounted to the projectile weapon, the eye point is located at a place on the vertical plane such that a line parallel to the line of initial trajectory and intersecting the eye point does not intersect the telescopic sight.

2. A projectile weapon aiming system, comprising:
   a telescopic sight including a housing having a mounting surface that facilitates mounting the telescopic sight on a projectile weapon in alignment with a line of initial trajectory of the projectile weapon, the housing supporting an optical system of the telescopic sight and positioning the optical system relative to the mounting surface, the optical system forming at a focal plane an image of a field of view of the telescopic sight, the optical system including:
      an objective having an optical axis horizontally offset relative to a vertical plane containing the line of initial trajectory when the telescopic sight is mounted to the projectile weapon;
      a light redirected device that receives light from the objective and redirects the light to a location horizontally offset from the optical axis of the objective; and
      an eyepiece positioned rearward of the focal plane and defining an eye point spaced apart rearwardly from the eyepiece at witch the image of the field of view is visible through the eyepiece, wherein, when the telescopic sight is mounted to the projectile weapon, the eye point is located at a place on the vertical plane such that a line parallel to the line of initial trajectory and intersecting the eye point does not intersect the eyepiece; and
      an aiming reticle located at the focal plane.

3. The aiming system of claim 1, wherein the eye point is located above a horizontal plane tangent to an uppermost edge of the eyepiece that faces away from the line of initial trajectory when the telescopic sight is mounted to the projectile weapon.

4. The aiming system of claim 3, further comprising a non-magnifying sight having a viewing window positioned predominantly above the horizontal plane when both the non-magnifying sight and the telescopic sight are mounted to the projectile weapon, such that both the telescopic sight and the non-magnifying sight can be used to aim the projectile weapon with essentially no movement of the viewer's head.

5. The aiming system of claim 4, wherein the non-magnifying sight and the telescopic sight are independently mountable in tandem on a common mounting rail of the projectile weapon and separately removable from the common mounting rail.

6. The aiming system of claim 4, wherein the non-magnifying sight is a reflex sight, and the viewing window is a partial reflector.

7. The aiming system of claim 4, wherein the non-magnifying sight is a holographic weapon sight.

8. The aiming system of claim 1, wherein:
the optical system defines an optical path extending from the objective to the eyepiece; and
the light redirection device includes spaced-apart first and second reflective surfaces arranged to fold the optical path.

9. The aiming system of claim 8, wherein:
the first reflective surface receives light from the objective and reflects it forwardly along a first path fold segment; and
the second reflective surface receives the light reflected by the first reflective surface and reflects such light rearward along a second path fold segment that is angled upwardly away from the line of initial trajectory.

10. The aiming system of claim 9, wherein the first path fold segment is angled downwardly toward the second reflective surface relative to an optical axis of the objective.

11. The aiming system of claim 8, wherein the first and second reflective surfaces comprise respective first and second mirrors.

12. The aiming system of claim 8, wherein the first and second reflective surfaces are surfaces of a prism system.

13. The aiming system of claim 1, wherein the light redirection device includes:
an image sensor; and
an electronic image display device positioned at the focal plane and spaced apart from the image sensor.

14. The aiming system of claim 1, wherein:
the objective forms a first image of the field of view at a front focal plane;
the focal plane viewed by the eyepiece is a rear focal plane spaced apart from the front focal plane; and
the optical system further includes:
an aiming reticle located at the front focal plane; and
a power-varying relay lens system interposed in an optical path between the front focal plane and the rear focal plane and including at least one lens element selectively movable along the optical path to vary an optical magnification of the telescopic sight.

15. The aiming system of claim 14, wherein the aiming reticle includes:
a primary aiming mark located on a vertical aiming axis; and
multiple holdover aiming marks spaced apart below the primary aiming mark, the holdover aiming marks laterally offset to one side of the vertical aiming axis to compensate for the horizontal offset of the objective.

16. The aiming system of claim 2, wherein the aiming reticle includes:
a primary aiming mark located on a vertical aiming axis; and
multiple holdover aiming marks spaced apart below the primary aiming mark, the holdover aiming marks laterally offset to one side of the vertical aiming axis to compensate for the horizontal offset of the objective.

17. The aiming system of claim 2, wherein the objective and the aiming reticle define a line of sight angled horizontally inward toward the vertical plane when the telescopic sight is mounted to the projectile weapon.

18. The aiming system of claim 2, wherein:
the objective and the aiming reticle define a line of sight of the optical system;
the objective includes an objective lens that is slidably supported on the housing for movement transversely of an optical axis of the objective lens relative to other elements of the optical system; and
the telescopic sight further comprises an adjustment mechanism supported on the housing and operable to drive the objective lens transversely of its optical axis to thereby adjust the line of sight of the telescopic sight.

19. The aiming system of claim 1, wherein the mounting surface includes a clamp that is sized and shaped to secure the telescopic sight to a Picatinny rail, the clamp including a fixed portion integrally formed in the housing and a movable jaw portion.

20. The aiming system of claim 1, wherein an outer surface of the housing includes an auxiliary sight mounting platform located forward of the eyepiece, the auxiliary sight mounting platform being horizontal and intersecting the vertical plane when the telescopic sight is mounted to the projectile weapon.

21. The aiming system of claim 20, further comprising a miniature reflex sight mounted to the auxiliary sight mounting platform.

22. The aiming system of claim 21, wherein:
the miniature reflex sight has a viewing window; and
when the telescopic sight is mounted to a mounting rail of the projectile weapon, a centroid of the viewing window is located between 1.3 and 1.75 inches above a top surface of the mounting rail.

23. The aiming system of claim 9, wherein the second reflective surface is pivotable from a first position receiving light reflected by the first reflective surface and reflecting such light along the second path fold segment, and a second position in which the second reflective surface receives image-display light from an electronic display device along a third optical path segment angularly offset from the first and second path fold segments and reflects the image-display light along the second path fold segment.

24. The aiming system of claim 2, wherein the light redirection device receives light from the objective along a first optical path segment and redirects it rearwardly along a second optical path segment from the light redirection device to the eyepiece, wherein the second optical path segment is spaced apart from the optical axis of the objective and angled upwardly from the line of initial trajectory.

25. The aiming system of claim 2, wherein:
the optical system defines an optical path extending from the objective to the eyepiece; and
the light redirection device includes spaced-apart first and second reflective surfaces arranged to fold the optical path.

26. The aiming system of claim 2, wherein the eye point is located above a horizontal plane tangent to an uppermost edge of the eyepiece that faces away from the line of initial trajectory when the telescopic sight is mounted to the projectile weapon.

27. The aiming system of claim 26, further comprising a non-magnifying sight having a viewing window positioned predominantly above the horizontal plane when both the non-magnifying sight and the telescopic sight are mounted to the projectile weapon, such that both the telescopic sight and the non-magnifying sight can be used to aim the projectile weapon with essentially no movement of the viewer's head.

* * * * *

UNITED STATES PATENT AND TRADEMARK OFFICE
CERTIFICATE OF CORRECTION

Page 1 of 1

PATENT NO.         : 9,115,958 B2
APPLICATION NO.    : 13/843445
DATED              : August 25, 2015
INVENTOR(S)        : Quint Crispin It is certified that error appears in the above-identified patent and that said Letters Patent is hereby corrected as shown below:

IN THE CLAIMS

In column 10, line 28, please replace "comprising;" with --comprising:--.

In column 10, line 41, please replace "light redirected device" with --light redirection device--.

In column 10, line 46, please replace "at witch" with --at which--.

Signed and Sealed this
Nineteenth Day of January, 2016

Michelle K. Lee
*Director of the United States Patent and Trademark Office*